Jan. 17, 1928.
G. A. LYON
1,656,212
BUMPER
Filed April 12, 1927
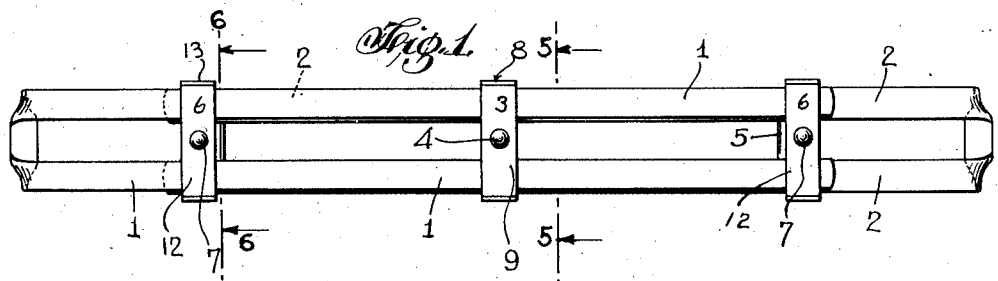
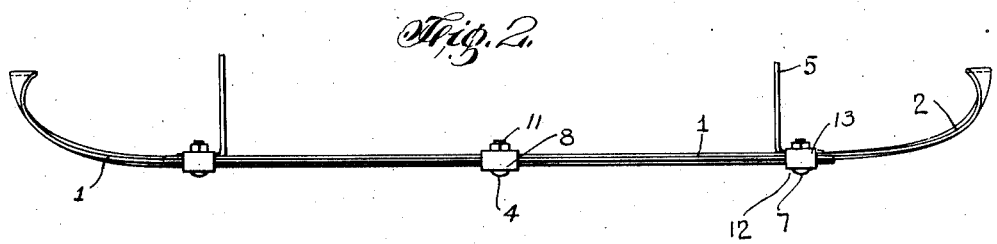
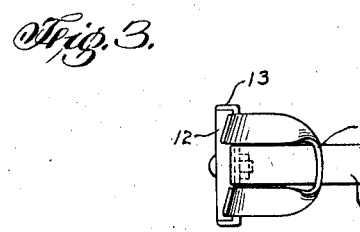
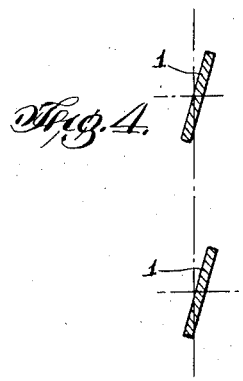
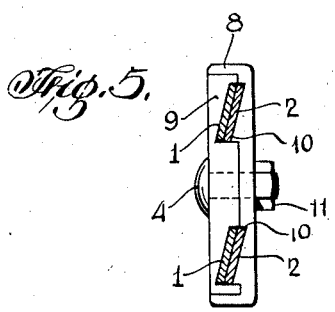
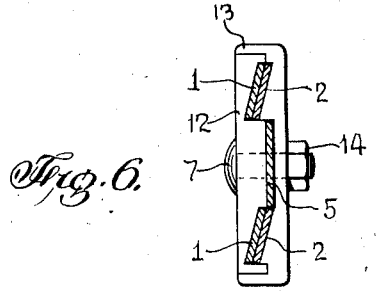
INVENTOR
George Albert Lyon
BY
Frederick S. Duncan, ATTORNEY

Patented Jan. 17, 1928.

1,656,212

UNITED STATES PATENT OFFICE.

GEORGE ALBERT LYON, OF ALLENHURST, NEW JERSEY, ASSIGNOR, BY MESNE ASSIGNMENTS, TO AMERICAN CHAIN COMPANY, INC., A CORPORATION OF NEW YORK.

BUMPER.

Application filed April 12, 1927. Serial No. 183,073.

This invention relates to automobile bumpers and more particularly to a type of bumper having the bars of its impact member inclined at a decided angle away from the surface of the road.

As is well known, the polished surfaces of the bars of a bumper, when perpendicular to the surface of the road, will reflect the light from the dull road surface to the eye of the observer, and will, therefore, appear dull and unattractive. It is also apparent that a light from a surface above the level of the bumper, such as lights from the sky or lights in a show-room, if caught and reflected back, will meet the eye of the observer and give a pleasing effect.

It is, therefore, the principal object of this invention to provide a bumper having an impact section comprising a plurality of upright polished bars, having their upper edges tilted away from a plane perpendicular to the surface of the road, thereby catching and reflecting the light from sources above the level of the bumper.

A further object is to provide a bumper having an impact section comprising a plurality of bars extending transversely of the vehicle and each tilted at an angle such that their upper edges are in vertical alignment with each other and their lower edges are in vertical alignment with each other.

A still further object is the provision of a clamp for holding said bars in the above alignment and to facilitate their attachment to a vehicle.

A clear conception of the construction and further objects of the invention may be had from the following specification in conjunction with the accompanying drawings in which:

Fig. 1 discloses the invention in front elevation.

Fig. 2 is a plan view of Fig. 1.

Fig. 3 is an end view of the invention showing an end folded.

Fig. 4 is a diagrammatic representation of the angle of the bars of the impact member.

Fig. 5 illustrates a clamp for use with the impact bars.

Fig. 6 is a view of a suitable form of clamp for attaching the supporting bar.

The now preferred form of the invention as shown in Fig. 1 consists of an impact member formed of continuous U-shaped bars 1 and 2 of flat spring steel having their ends bent or folded as shown at 2 in Figs. 1, 2, and 3. It is obvious that this type of bumper may also be formed of a continuous strip of flat spring steel. With the bar bent as shown, the impact member is strengthened and it also forms a curved end which will prevent hooking. A clamp 3 is secured about the bars in the center of the impact member by bolt 4, and holds the bars in vertical alignment. A pair of supporting bars 5 are secured to the impact section by means of clamps 6 which are held rigidly secure about the bars 1 and 5 by bolt 7.

The bars 1 and 2 of the impact section are bent throughout their central portion at an angle as shown in Fig. 4. Both bars are preferably bent at the same angle so that their upper edges are in the same vertical plane and the lower edges are in a second vertical plane, said planes being parallel to each other and perpendicular with respect to the road. With the bars inclined in this manner, the polished surfaces of the bumper will reflect the light from sources above the level of the bumper to the eye of the observer, and give the bumper an ornamental effect. Such sources as the light from the sky or from the lights of a show-room would give this effect.

The clamp 3 mentioned in the above description is shown in detail in Fig. 5. It consists of two members 8 and 9 with inclined recesses 10 therein for accommodating the bars 1 and 2 of the impact section about which it is secured by means of bolt 4 and nut 11. The bracket 6 is shown in detail in Fig. 6 and consists of two members, 12 and 13, similar to members 8 and 9, with the exception that the member 13 has a recess therein for accommodating the supporting arm 5 which has a hole drilled therein for accommodating the bolt 7. The clamp is secured about the bars by means of bolt 7 and nut 14. It is apparent from the above that this type of bumper will give a strong buffer structure which will be pleasing to the eye.

I claim:

1. In an automobile bumper of the type described, an impact member comprising a pair of bars of flat spring steel, said bars having their surfaces polished and having their upper edges tilted back at an angle from a plane perpendicular to the surface of the road, 2. In an automobile bumper of the type described, an impact member comprising a pair of bars of flat spring steel, said bars having their surfaces polished and having their upper edges tilted back at an angle from a plane perpendicular to the surface of the road, thereby reflecting light from a source above the level of the bumper to the eyes of the observer.

3. In an automobile bumper of the type described, an impact member comprising a pair of U-shaped bars of polished flat spring steel, having their upper edges tilted back at an angle from a plane perpendicular to the surface of the road, and means intermediate of their ends to secure said bars in vertical alignment in their tilted relation.

4. In an automobile bumper of the type described, an impact member comprising a pair of U-shaped bars of polished flat spring steel, having their upper edges tilted back at an angle from a plane perpendicular to the surface of the road, and a pair of clamps for securing said bars in vertical alignment in their tilted position and readily securing said bumpers to a pair of supporting bars located intermediate of the ends of said impact member.

5. In an automobile bumper of the type described, an impact member comprising a pair of U-shaped bars of polished flat spring steel, having their upper edges tilted back at an angle from a plane perpendicular to the surface of the road, and a pair of clamps for securing said bars in vertical alignment in their tilted position and readily securing said bumpers to a pair of supporting bars located intermediate of the ends of said impact member, said clamps comprising a front and rear plate with recesses therein for accommodating said impact and supporting bars, said plates being secured about said bars by means of a bolt.

6. In an automobile bumper of the type described, an impact member comprising a plurality of bars having broad upright light reflecting surfaces and having their upper edges tilted back at an angle from a plane perpendicular to the surface of the road.

7. In an automobile bumper of the type described, an impact member comprising a plurality of bars having broad upright light reflecting surfaces and having means for securing said bars in parallel alignment with the upper edges tilted back at an angle from a plane perpendicular to the surface of the road.

In testimony whereof, I have signed this application.

GEORGE ALBERT LYON.